US012580455B2

(12) United States Patent
Klos

(10) Patent No.: US 12,580,455 B2
(45) **Date of Patent: \*Mar. 17, 2026**

(54) GENERATOR ENCLOSURE WITH FIRE DAMPER

(71) Applicant: Discovery Energy, LLC

(72) Inventor: Brandon Klos, Kohler, WI (US)

(73) Assignee: Discovery Energy, LLC, Kohler, WI (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/436,748

(22) Filed: Feb. 8, 2024

(65) Prior Publication Data

US 2024/0243642 A1 Jul. 18, 2024

Related U.S. Application Data

(63) Continuation of application No. 17/514,846, filed on Oct. 29, 2021, now Pat. No. 11,949,298.

(Continued)

(51) Int. Cl.
*H02K 11/25* (2016.01)
*A62C 2/24* (2006.01)
(Continued)

(52) U.S. Cl.
CPC .............. *H02K 11/25* (2016.01); *A62C 2/242* (2013.01); *A62C 2/247* (2013.01); *F02B 63/044* (2013.01);
(Continued)

(58) Field of Classification Search
CPC ...... H02K 11/25; H02K 5/207; H02K 7/1815; H02K 9/18; H02K 2213/06;
(Continued)

(56) References Cited

U.S. PATENT DOCUMENTS 3,521,692 A 7/1970 Johnson et al.
3,597,809 A 8/1971 Crane
(Continued)

FOREIGN PATENT DOCUMENTS

CA 1246961 A 12/1988
CN 201423103 Y 3/2010
(Continued)

OTHER PUBLICATIONS

"Dampers and Actuators," Johnson Controls. Catalog Source: https://cgproducts.johnsoncontrols.com/cat_pdf/PUBL-7211.pdf Publication Date: 2013. (pp. 1-150).

*Primary Examiner* — Hung Q Nguyen
(74) *Attorney, Agent, or Firm* — The Belles Group, P.C.

(57) ABSTRACT

A generator enclosure for an engine-generator includes multiple walls defining at least one air path. In one example, a first wall includes an exhaust path for the engine-generator, and a second wall includes an intake path for the engine-generator. The generator enclosure may include at least one air flow frame associated with the exhaust path or the intake path and at least one movable wall supported by the at least one air flow frame. At least one thermal fuse may be coupled to the at least one movable wall and configured to release the at least one movable wall to block the exhaust path or the intake path.

22 Claims, 12 Drawing Sheets

Related U.S. Application Data

(60) Provisional application No. 63/109,556, filed on Nov. 4, 2020.

(51) Int. Cl.

| | | |
|---|---|---|
| *F02B 63/04* | (2006.01) |
| *F02M 35/10* | (2006.01) |
| *H02K 5/20* | (2006.01) |
| *H02K 7/18* | (2006.01) |
| *H02K 9/18* | (2006.01) |

(52) U.S. Cl.
CPC ....... *F02M 35/10242* (2013.01); *H02K 5/207* (2021.01); *H02K 7/1815* (2013.01); *H02K 9/18* (2013.01)

(58) Field of Classification Search
CPC ...... H02K 2213/09; H02K 5/136; H02K 9/02; H02K 9/04; A62C 2/242; A62C 2/247; A62C 2/16; A62C 3/16; F02B 63/044; F02M 35/10242
See application file for complete search history.

(56) References Cited

U.S. PATENT DOCUMENTS

| | | | |
|---|---|---|---|
| 3,613,795 | A | 10/1971 | Amicone et al. |
| 3,752,208 | A | 8/1973 | Roberts |
| 3,874,401 | A | 4/1975 | Karg |
| 4,161,204 | A | 7/1979 | Kurz |
| 4,184,288 | A | 1/1980 | Field et al. |
| 4,334,570 | A | 6/1982 | Adams |
| 4,559,867 | A | 12/1985 | Van et al. |
| 4,835,405 | A | 5/1989 | Clancey et al. |
| 6,651,952 | B1 | 11/2003 | Hightower et al. |
| 8,991,191 | B2 | 3/2015 | Diaz et al. |
| 9,382,729 | B2 | 7/2016 | Ellis et al. |
| 11,949,298 | B2 * | 4/2024 | Klos .................... A62C 2/242 |
| 2004/0209566 | A1 | 10/2004 | Caliendo et al. |
| 2018/0311519 | A1 | 11/2018 | Jenks et al. |

FOREIGN PATENT DOCUMENTS

| | | | |
|---|---|---|---|
| CN | 201438654 U | | 4/2010 |
| CN | 201918861 U | | 8/2011 |
| CN | 202328579 U | | 7/2012 |
| CN | 204456985 U | | 7/2015 |
| CN | 208184310 U | | 12/2018 |
| CN | 209654128 U | | 11/2019 |
| CZ | 9876 U1 | | 4/2000 |
| DE | 102017219950 A1 | | 5/2019 |
| EP | 0015723 A1 | | 9/1980 |
| EP | 0887086 A2 | | 12/1998 |
| EP | 1023922 A1 | | 8/2000 |
| EP | 3235546 A1 | | 10/2017 |
| EP | 3782704 A1 | | 2/2021 |
| FR | 2943396 A1 | | 9/2010 |
| GB | 2278736 A | | 12/1994 |
| GB | 2286239 A | | 8/1995 |
| GB | 2369571 A | | 6/2002 |
| JP | 58197416 A | | 11/1983 |
| JP | H0979625 A | | 3/1997 |
| JP | H09217564 A | | 8/1997 |
| JP | 2549134 Y2 | | 9/1997 |
| JP | 3290858 B2 | | 6/2002 |
| KR | 200301004 Y1 | | 1/2003 |
| KR | 200334201 Y1 | | 11/2003 |
| KR | 20090093297 A | * | 9/2009 |
| KR | 20130044993 A | | 5/2013 |
| KR | 101429958 B1 | | 8/2014 |
| KR | 102079995 B1 | | 2/2020 |
| KR | 20200052490 A | | 5/2020 |
| WO | 9426352 A1 | | 11/1994 |
| WO | 0216720 A2 | | 2/2002 |
| WO | 0243810 A2 | | 6/2002 |
| WO | 2004092519 A1 | | 10/2004 |
| WO | 2017021592 A1 | | 2/2017 |
| WO | 2018172822 A1 | | 9/2018 |

* cited by examiner

S201

Couple a closure spring to a fire damper.

S203

Apply a force to the closure spring to hold the fire damper in an open position.

S205

Attach a fused link to the fire damper in the open position.

S207

Remove the fused link after a break in the fused link.

S209

Replace the broken fused link with a new fused link.

GENERATOR ENCLOSURE WITH FIRE DAMPER

CROSS-REFERENCE TO RELATED APPLICATIONS

This application is a continuation of U.S. patent application Ser. No. 17/514,846, filed Oct. 29, 2021, which claims priority benefit of Provisional Application No. 63/109,556 filed Nov. 4, 2020, which are hereby incorporated by reference in their entireties.

FIELD

This disclosure relates in general to fire protection in generators and/or within generator enclosures.

BACKGROUND

Generators are used in a variety of applications to provide electrical power when power from a power grid is unavailable or not wanted. Generators may be used in both commercial and residential settings. In both instances the generator may be placed outside of a building structure. Certain regulations may specify allowable distances between a generator and the building structure. Some concerns may include the risk of a fire or extreme heat at the generator spreading to the building structure. What is needed is further preventive measures to limit or prevent the spread of fire or extreme heat.

BRIEF DESCRIPTION OF THE DRAWINGS

Exemplary embodiments are described herein with reference to the following drawings.

DETAILED DESCRIPTION

The following description and the drawings illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
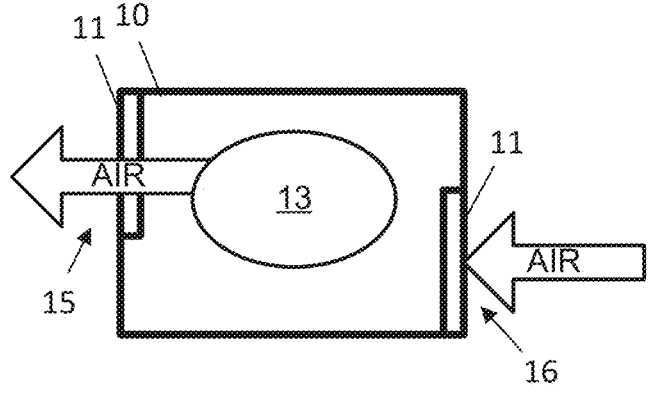
FIG. 1A illustrates a first embodiment of a generator enclosure including a fire damper.

FIG. 1A illustrates a top view of an example generator enclosure system 10. The generator enclosure houses an engine-generator 13. As shown by the arrows, at least one air path flows through the generator enclosure system 10. There is at least one exhaust air opening 15 and at least one air inlet 16. Air from the ambient environment flows through the at inlet 16 in order to cool and provide combustion air to the engine-generator 13. Exhaust air from the engine-generator 13, as well as any residual ambient air, flows out of the generator enclosure system 10 through the exhaust air opening 15.

A fire damper 11 may be installed at either or both of the of the exhaust air opening 15 or air inlet 16. There may be any number of fire dampers 11 in the generator enclosure system 10. Under normal operations, the fire damper 11 is a metal frame at the exhaust air opening 15 where the air from the engine compartment flows through or at the air inlet 16 where the ambient air flows through. As discussed in more detail below, the fire damper 11 is normally open but includes one or more triggering mechanism that causes the fire damper to physically close or stop the flow of air through the exhaust air opening 15 or the air inlet 16. In the event of a fire or other combustion event within the generator enclosure, when the flow of air is stopped, the other fire or other combustion event will be stopped.

The fire damper 11 may be in any single wall of the generator enclosure system 10. As shown in FIG. 1A the fire damper 11 may be installed in two walls that are opposite of one another so that the flow of air is generally across the generator enclosure system 10 in a single direction. However, the fire damper 11 may be install in two walls that are adjacent to one another (e.g., a front wall and a side wall). In some example fire dampers 11 are install in three or four walls (e.g., all side walls of the generator enclosure system 10).

The engine generator 13 includes an engine and alternator. The engine includes one or more motor mounts securing the engine to the generator enclosure system 10. The engine may be an internal combustion engine. The engine may include components such as crankshaft, flywheel, muffler, air cleaning system, and a control portion. The engine may be a two-stroke engine or a four-stroke engine. The number of cylinders of the engine may vary to include one cylinder or multiple cylinders. The size of the engine may vary depending on the application.

The engine may be any type of engine in which the combustion of a fuel (e.g., gasoline or another liquid fuel) with an oxidizer (e.g., air) in a chamber applies a force to a drive component (e.g., piston, turbine, or another component) of the engine. The drive component rotates to turn a drive shaft. The combustion air for the engine is brought in through the combustion air inlet. The engine may include an electrical fan or a fan connected to the drive shaft.

The drive shaft of the engine may be connected to the alternator. An alternator housing encompasses the alternator. The alternator housing connects to the engine on one end. On the other end the alternator housing connects to the generator enclosure system 10. The alternator is operated by rotation of the drive shaft to turn the alternator and produce electric output.

Figure 1B:
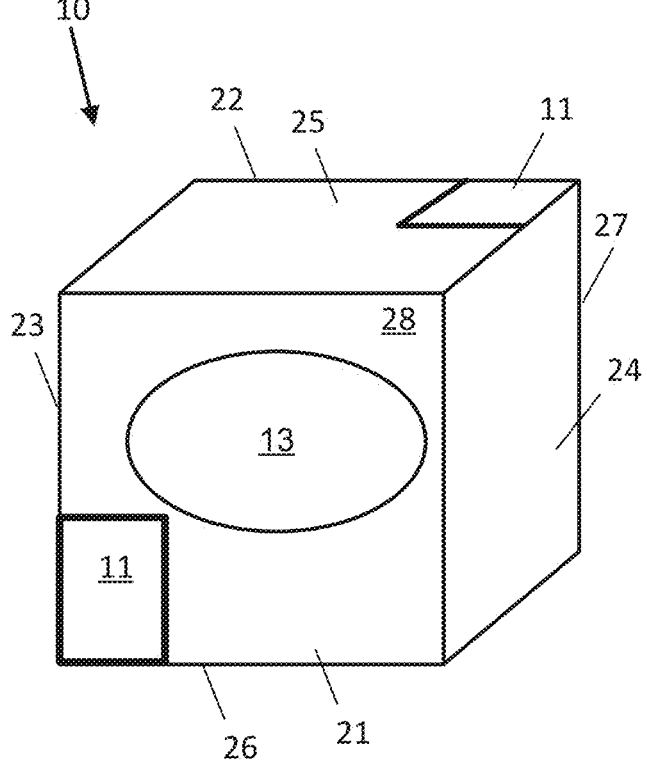
FIG. 1B illustrates a first embodiment of a generator enclosure including a fire damper.

FIG. 1B illustrates a first embodiment of a generator enclosure including a fire damper 11 in a perspective view. In this example, the generator enclosure system 10 includes a top wall 25, a bottom wall 26, a left side wall 23, and a right side wall 24, a rear wall 27, and a front wall 28. Any combination or all of these walls may include a fire damper 11 and an air flow opening. As illustrated in FIG. 1B, the top wall 25 and the front wall 28 each include the fire damper 11. An air flow path flows from the fire damper 11 at the top wall 25 across or through the engine-generator 13 to the fire damper 11 at the front wall 28 and/or an air flow path flows from the fire damper 11 at the front wall 28 to the fire damper 11 at the top wall 25. Many different air paths are possible.

Figure 2:
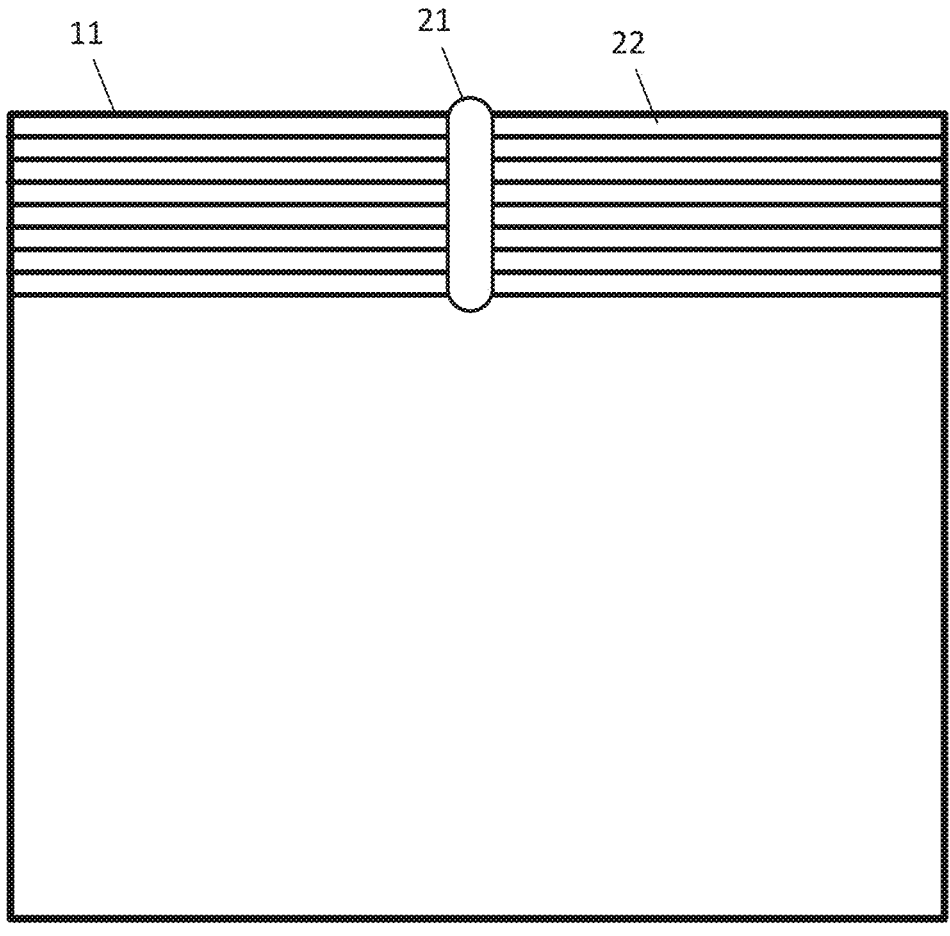
FIG. 2 illustrates an example fire damper in an initial state.
Figure 3:
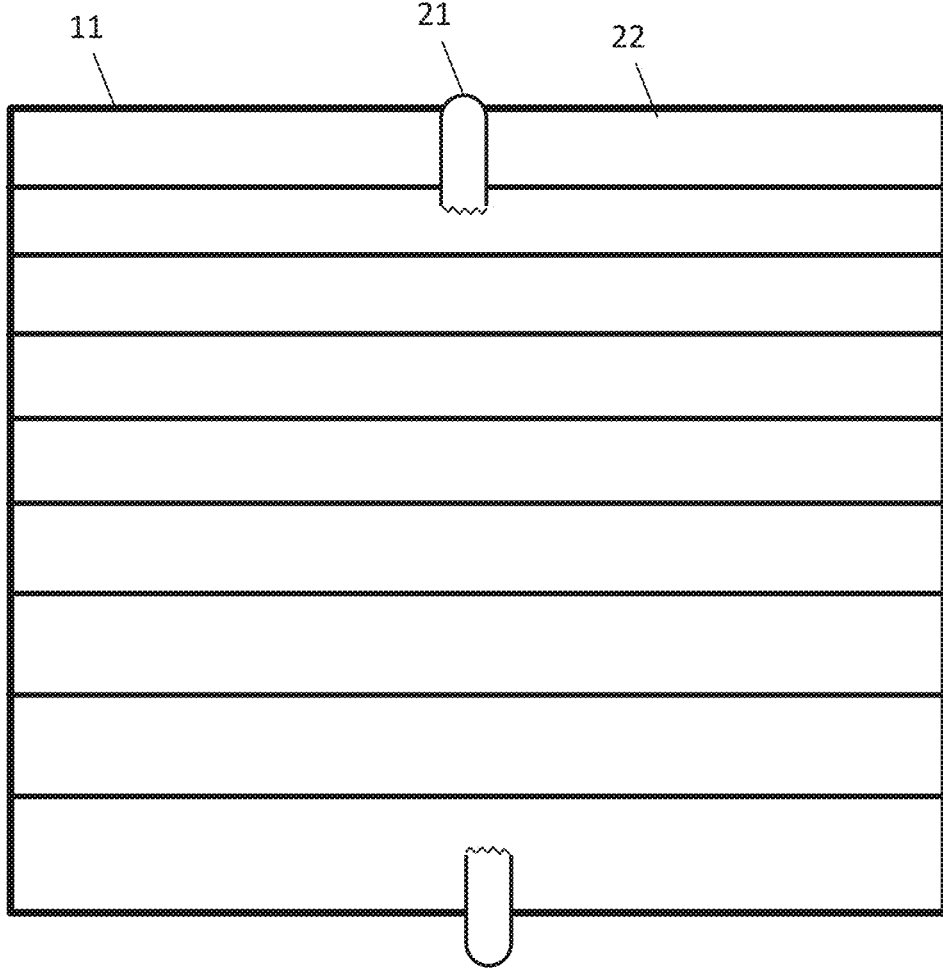
FIG. 3 illustrates an example fire damper in an actuated state.

FIG. 2 illustrates an example fire damper 11 in an initial state. FIG. 3 illustrates the example fire damper 11 in an actuated state. The fire damper 11 includes at least a closing mechanism 22 and a fused link 21. The initial state means that the fire damper 11 has not yet been trigged or closed. The fused link 21 may include a fuse made of a thermally sensitive material and one or more securing members that hold the closing mechanism 22 in the opened position illustrated in FIG. 2. The thermally sensitive material may have a predetermined melting point that is set according to the makeup of the alloy.

The closing mechanism 22 may substantially close the opening when triggered. Substantially closed may be completely closed or completely closed within a small margin of leakage. The small margin of leakage may be defined according to a percentage of air or oxygen from normal operation. The small margin of leakage may be defined according to one or more physical dimensions that remain open after the closing mechanism 22 is substantially closed.

The closing mechanism 22 may include a door, a set of blinds, or any device configured to close the opening associated with the fire damper 11. The door of the closing mechanism may be a flexible metal door that is rolled up in the initial state and unrolls along a set of tracks on opposite sides of the fire damper 11 when triggered. The blinds may be multiple metal sections that fold onto each other when in the initial state (e.g., accordion shape) but fall into an extended state when released.

FIG. 2 illustrates a fused link 21 for the fire damper 11 in an initial state. FIG. 3 illustrates fused link 21 for the fire damper in an actuated state or triggered state.

The fused link 21 includes one or more temperature sensitive materials to create a thermal fuse. The thermal fuse changes state when the surrounding temperature reaches a threshold. The threshold may be set or may be within a margin of error range that fluctuates. The threshold may be a range such as 150-300 degrees Fahrenheit, for example 165, 212, or 286 degrees Fahrenheit. The threshold may be 286 degrees Fahrenheit. When the state of the thermal fuse changes due to temperature, the thermal fuse may melt, separate or break. In one example, one side of the thermal fuse is connected to a frame of the fire damper 11 and the other side of the thermal fuse is connected to the closing mechanism 22. When the thermal fuse separates or breaks, the closing mechanism 22 is free to close.

In some examples, the fused link 21 cannot be reset. Once the fused link 21 has been triggered, the closing mechanism may be moved back to the opened position and the fused link 21 is replaced with a new fused link 21 (replacement fused link).

The fused link 21 may be configured in a variety of arrangements depending on how the closing mechanism 22 is stored in the initial state. The closing mechanism 22 may fall when the thermal fuse breaks under one or more of a variety of forces. FIGS. 4-8 describe various possible arrangements.

Figure 4:
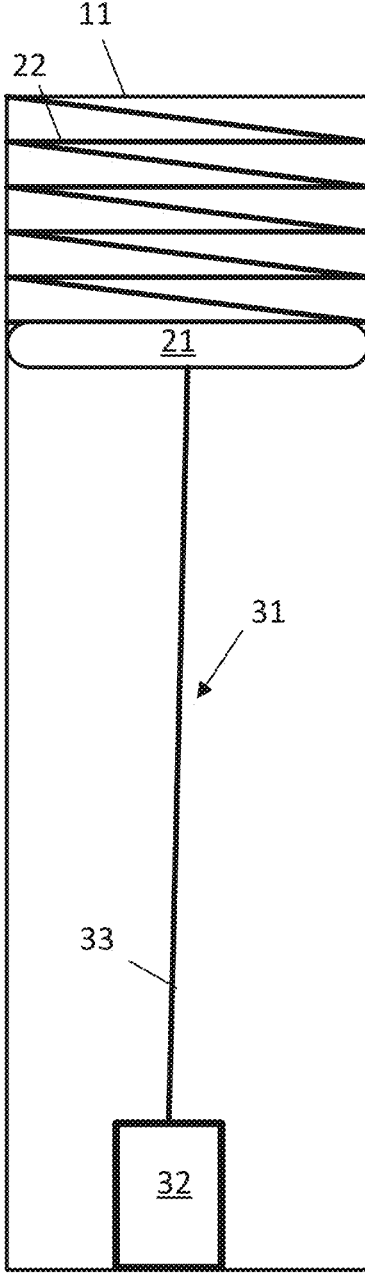
FIG. 4 illustrates another example of a fire damper.

FIG. 4 illustrates another example of a fire damper 11 having a closing mechanism 22 that is held closed by the fused link 21. The fused link 21 may extend across the opening from one side of the frame to the other side of the frame of the fire damper 11. When it is extended, the fused link 21 prevents the closing mechanism 22 from closing across the opening.

A closure spring 31 may provide a bias force to the closing mechanism 22 (e.g., downward force) that would tend to close the closing mechanism 22 but is prevented by the fused link 21 block the path for the closing mechanism 22 to extend. When the fused link 21 breaks due to temperature, the path is cleared, and the closing mechanism 22 is free to extend and block the path through the fire damper 11. The closing mechanism 22 may fall due only due to gravity, or at least in part due to gravity. However, in FIG. 4, the closure spring 31 provides the bias force to pull the closing mechanism 22 across the path through the fire damper 11. The closure spring 31 may be a coil spring that is twisted to store energy and housed within the spring housing 32. The coil spring winds up a leaf spring 33 or wire that pulls on the closing mechanism 22 to close the fire damper.

Figure 5:
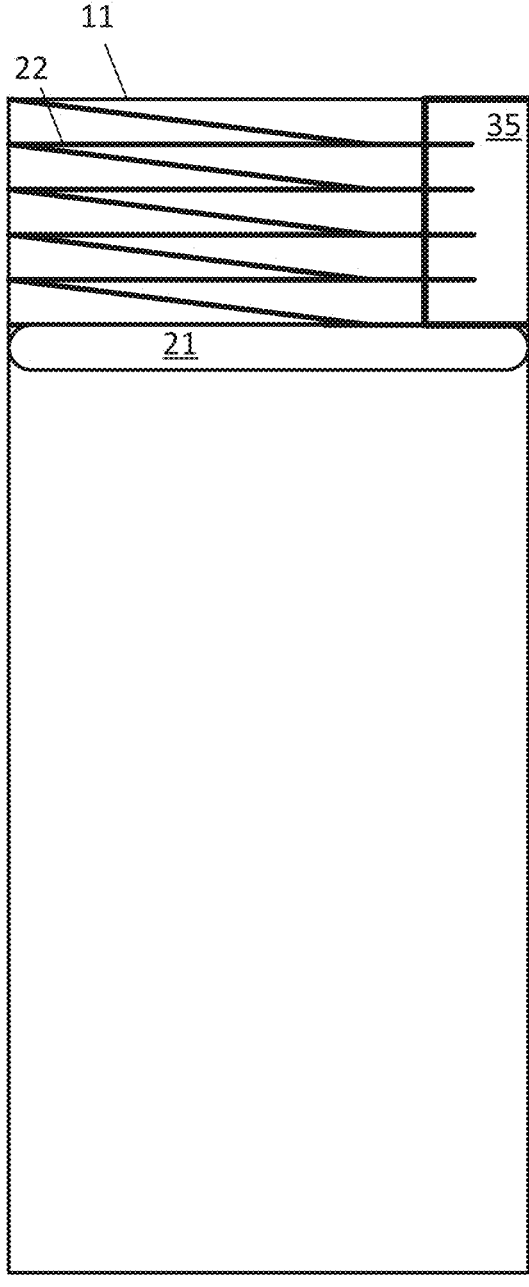
FIG. 5 illustrates another example of a fused link for the fire damper.

FIG. 5 illustrates another example of the fused link 21 for the fire damper 11. In this example, a spring 35 is coupled to the closing mechanism 22 directly. The spring 35 provide a force to push the closing mechanism 22 down across the opening. When it is still fused together, the fused link 21 stops the spring 35 from pushing the closing mechanism 22 across the opening. When the fused link 21 melts or breaks, the path is opened for the spring 35 to push the closing mechanism 22 closed across the opening.

Figure 6:
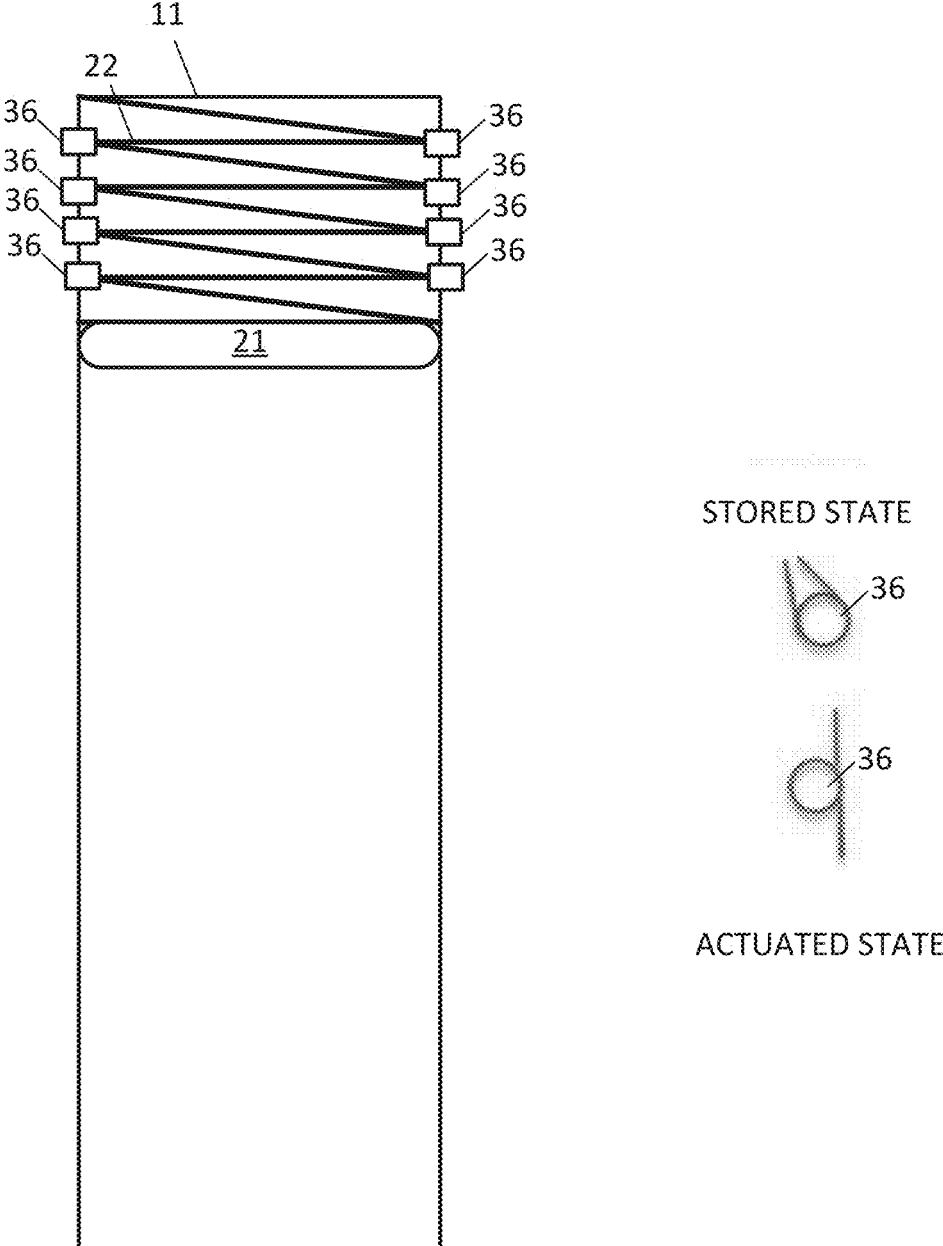
FIG. 6 illustrates another example of a fused link for the fire damper.

FIG. 6 illustrates another example of the fused link 21 for the fire damper 11. In this example, each section joint of the closing mechanism 22 may include a spring 36. The spring 36 may tend to push the closing mechanism 22 outward in an actuated state when the fused link melts or breaks.

Figure 7:
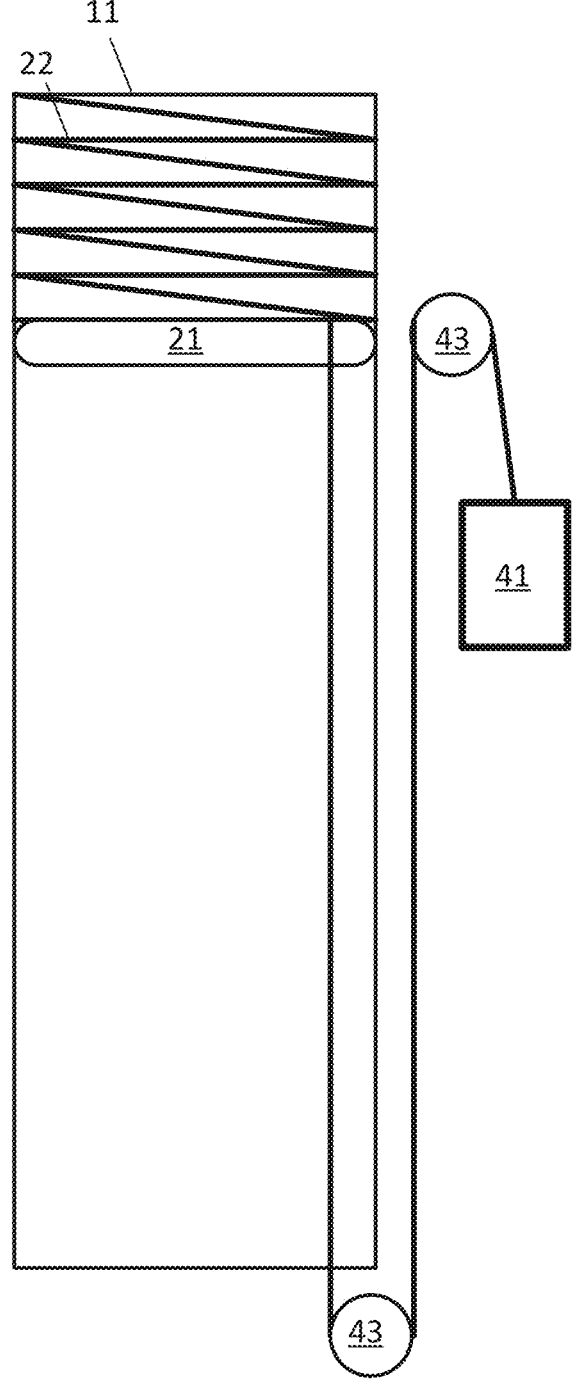
FIG. 7 illustrates another example of a fused link for the fire damper.

FIG. 7 illustrates another example of a fused link for the fire damper. In this example, the force applied to the closing mechanism 22 originates outside of the fire damper 11. In this example, a weight 41 is arranged using one or more pulleys 43 to guide a wire. The wire and weight 41 provides the downward force on the closing mechanism 22. When it is still fused together, the fused link 21 stops the wire from pulling the closing mechanism 22 across the opening. When the fused link 21 melts or breaks, the path is opened for the wire to pull the closing mechanism 22 closed across the opening.

Figure 8:
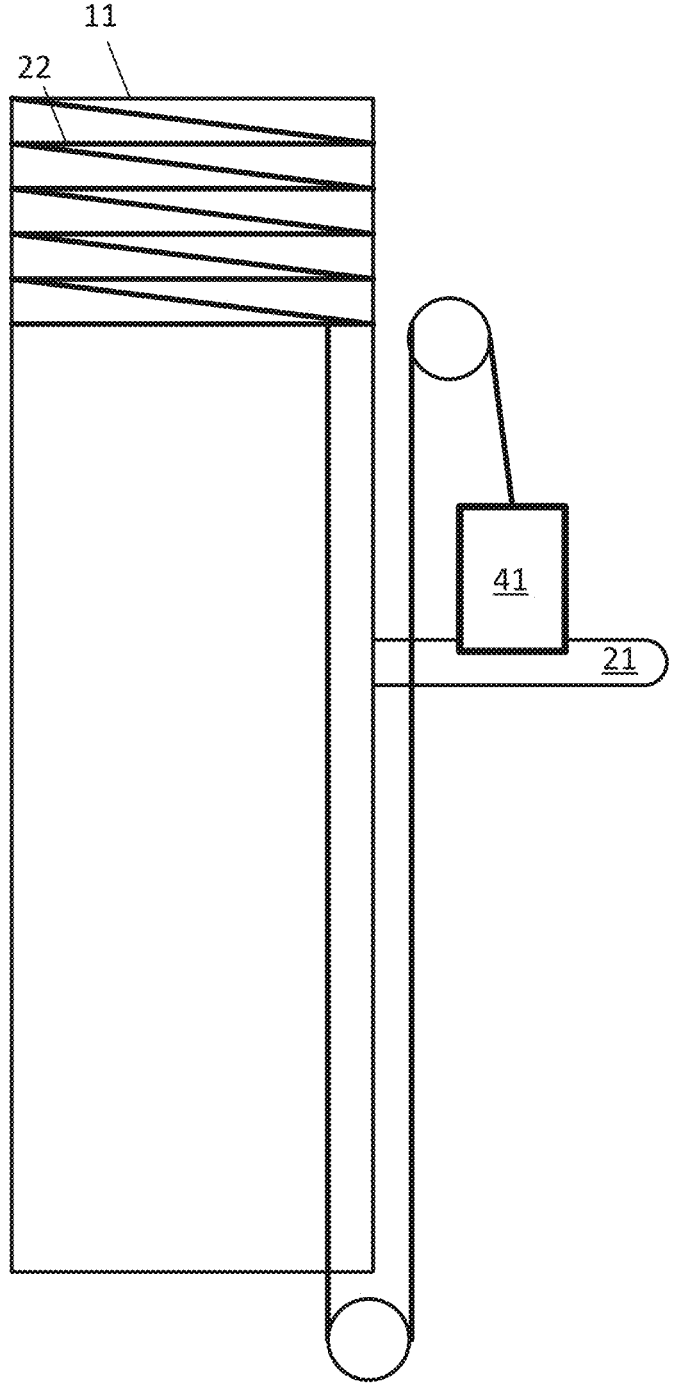
FIG. 8 illustrates another example of a fused link for the fire damper.

FIG. 8 illustrates another example of a fused link for the fire damper 11. In this example, the force applied to the closing mechanism 22 originates outside of the fire damper 11 and the fused link 21 is outside of the fire damper 11. The fire damper 11 may be located in a location closer to the engine generator 13 or at a location more susceptible to fire. When it is still fused together, the fused link 21 stops the wire from pulling the closing mechanism 22 across the opening. When the fused link 21 melts or breaks, the path is opened for the wire to pull the closing mechanism 22 closed across the opening.

Figure 9:
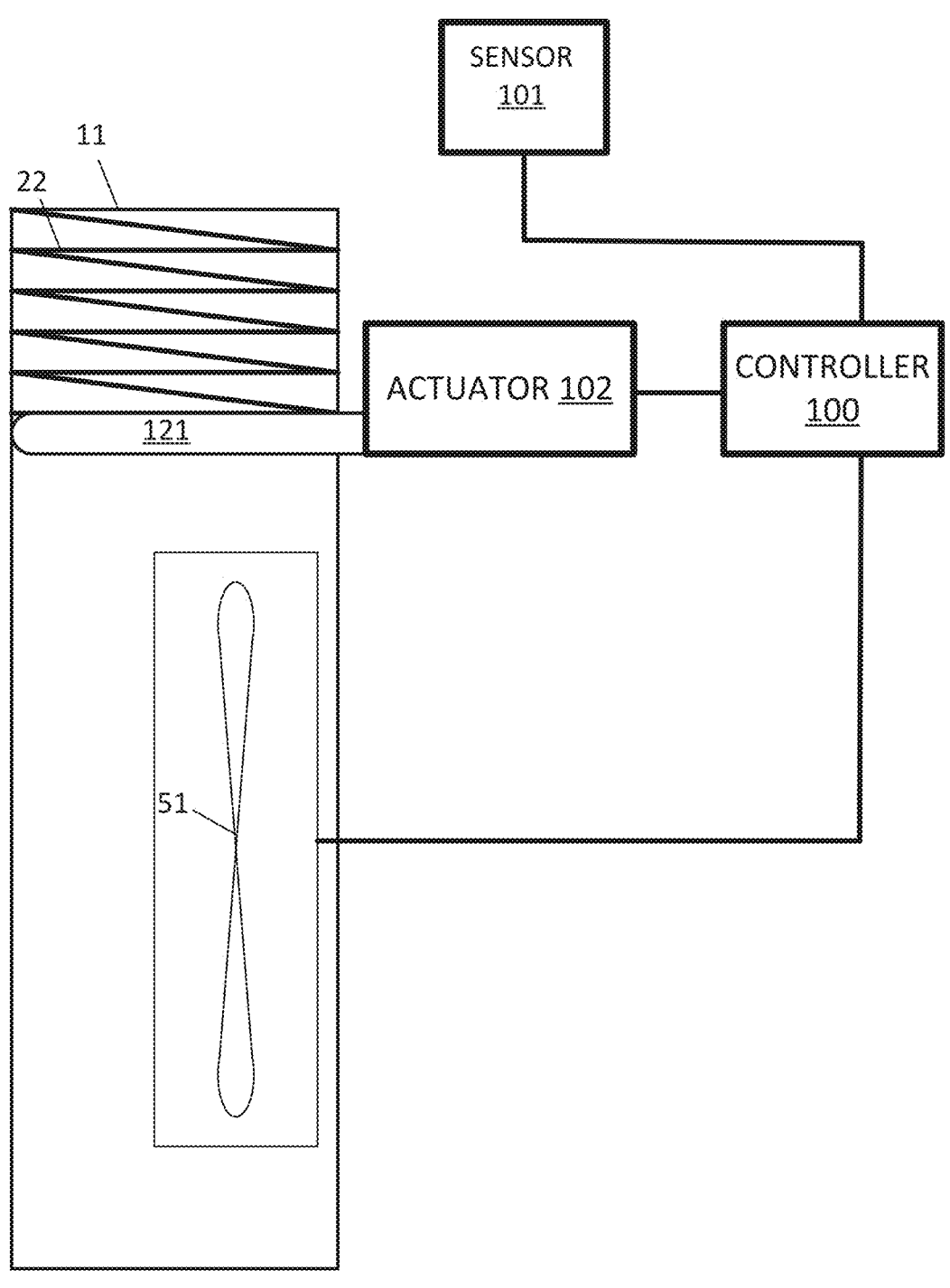
FIG. 9 illustrates an example control system for a removable link for the fire damper.

FIG. 9 illustrates an example control system for a removable link for the fire damper. In this example, a controller 100 provides an instruction or command that causes another mechanism to apply a force to release the closing mechanism 22 to close across the opening of the fire damper. The controller 100 may control actuator 102 to release the closing mechanism 22 through a pin (e.g., retaining mechanism). The actuator 102 may include a solenoid that pulls the pin to release the closing mechanism 22. The controller 100 receives data from the sensor 101. The controller 100 compares the sensor data to a temperature threshold and instructs the actuator 102 to release the closing mechanism 22 when the threshold is exceeded.

In some examples, the control system is a backup system for the fused link 21. If the fused link fails and does not release the closing mechanism 22, the control system releases the closing mechanism 22. Likewise, the fused link 21 may be a backup system for the control system.

The controller 100 may also control a fan 51 associated with the exhaust path or the intake path. The controller 100 may compare the sensor data to a fan temperature threshold to turn off the fan 51 and a damper threshold to close the closing mechanism 22.

Figure 10:
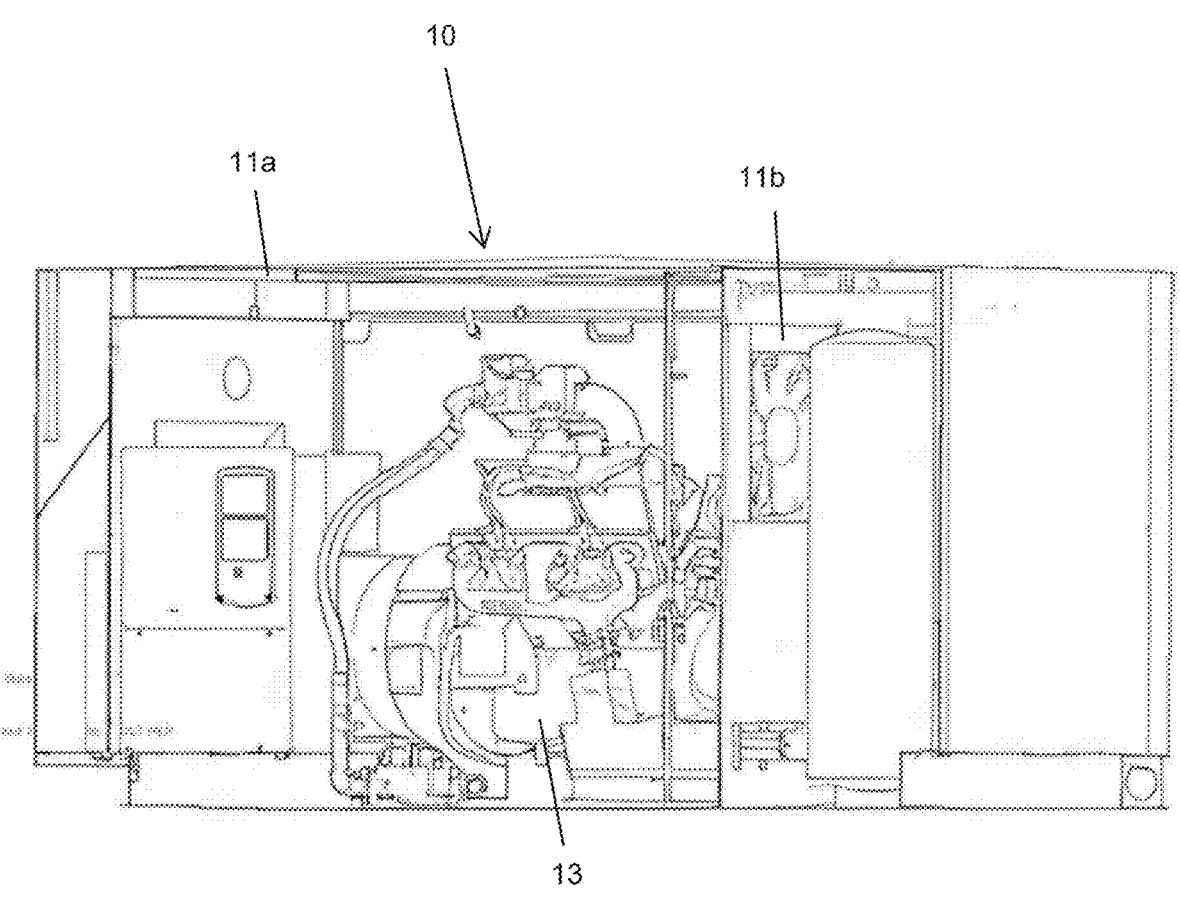
FIG. 10 illustrates a third embodiment of a generator enclosure including a fire damper.

FIG. 10 illustrates a third embodiment of a generator enclosure 10 including two fire dampers 11a and 11b at opposing sides of engine generator 13. One of the fire dampers 11a may be aligned horizontally for a vertical air path and one of the fire dampers 11b may be aligned vertically for a horizontal air path.

Figure 11:
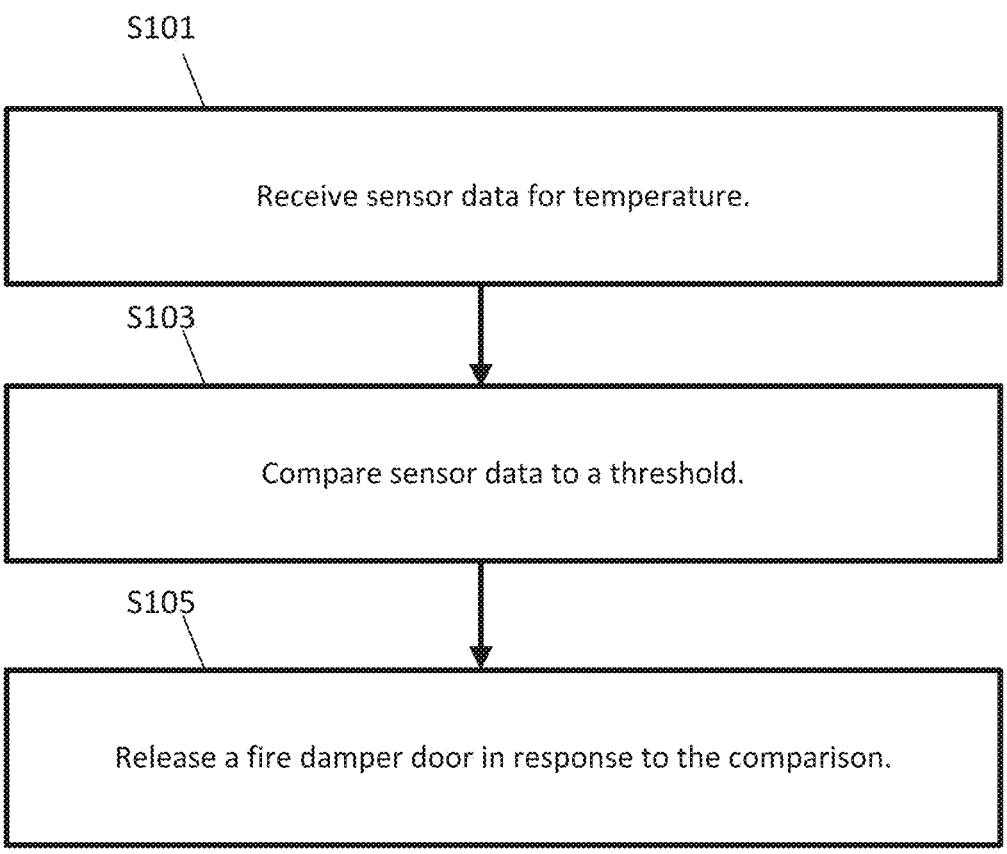
FIG. 11 illustrates an example flowchart for operation of the fire damper.

FIG. 11 illustrates an example flowchart for operation of a control system for the fire damper of FIGS. 1-9. Additional, different or fewer acts may be included.

At act S101, the controller 100 receives sensor data from the sensor 101. The sensor 101 may be placed in any location within the generator enclosure. The sensor 101 may be located within the generator or engine. In some examples, the sensor 101 is an engine sensor, for example, in communication with the engine control unit. The controller 100 may be the same as the engine control unit or in communication with the engine control unit.

In other examples, there may be an array of sensors mounted at various locations in the generator enclosure. With the sensor array, a fire may be detected at any off the various locations quickly before the fire has spread.

The sensor 101 may be a temperature sensor but in some examples may also be a smoke detector, a carbon monoxide sensor, a flame sensor, or a fire sensor.

At act S103, the controller 100 compares the sensor data to a threshold. The threshold may be a temperature threshold. The threshold may be configurable. That is, the user may provide the threshold to the controller 100. In some examples, the generator enclosure includes a keypad or other input device for the user to enter the temperature threshold. In some examples, the controller 100 is coupled with a communication interface configured to receive the user input. The communication interface may allow cellular, Bluetooth, or other wireless communication.

Other user inputs the controller 100 may affect other settings or control sequences. For example, the user may provide a user input wirelessly or through a keypad that initiates a test sequence for the controller 100. The test sequence may monitor the temperature or other sensor data for the generator. The temperature may be monitored for one or more engine starts and stops or duty cycles of the engine-generator. From a predetermined time period of normal operation, the controller 100 determines the temperature threshold based on the test sequence. For example, the temperature threshold may be set as 200% or 300% off the average temperature or the maximum temperature during the test sequence of normal operation.

At act S105, the controller 100 generates and sends an instruction to a release mechanism to cause the fire damper door to close. Based on the comparison of act S103, the controller 100 determines whether the sensor data exceeds the threshold. For example, in the case of temperature, the controller 100 determines whether the temperature detected by the sensor 101 exceeds the temperature threshold, which is indicative of fire or another unplanned combustion event within the generator enclosure. When the temperature detector by the sensor 101 does not exceed the temperature threshold, the controller 100 does not cause the fire damper to close, which may mean an absence of an instruction to the release mechanism or confirmation instruction to the release mechanism indicating that fire damper door is to remain open.

In some examples, the release mechanism allows an external force to act on the fire damper. For example, the external force may be provided by a weight, a spring, or other source of stored energy that is coupled to the fire damper.

In some examples, the releases mechanism is a motor or a solenoid. The instruction from the controller 100 may be an actuation command that causes the motor or solenoid to apply a force to the fire damper. The actuation command may be a step position for the motor. That actuation command may cause the solenoid to move to a predetermined position. In either example, the actuation command causes the fire damper to be pulled, pushed, or otherwise released into the closed position to close the opening in the generator enclosure.

Figure 12:
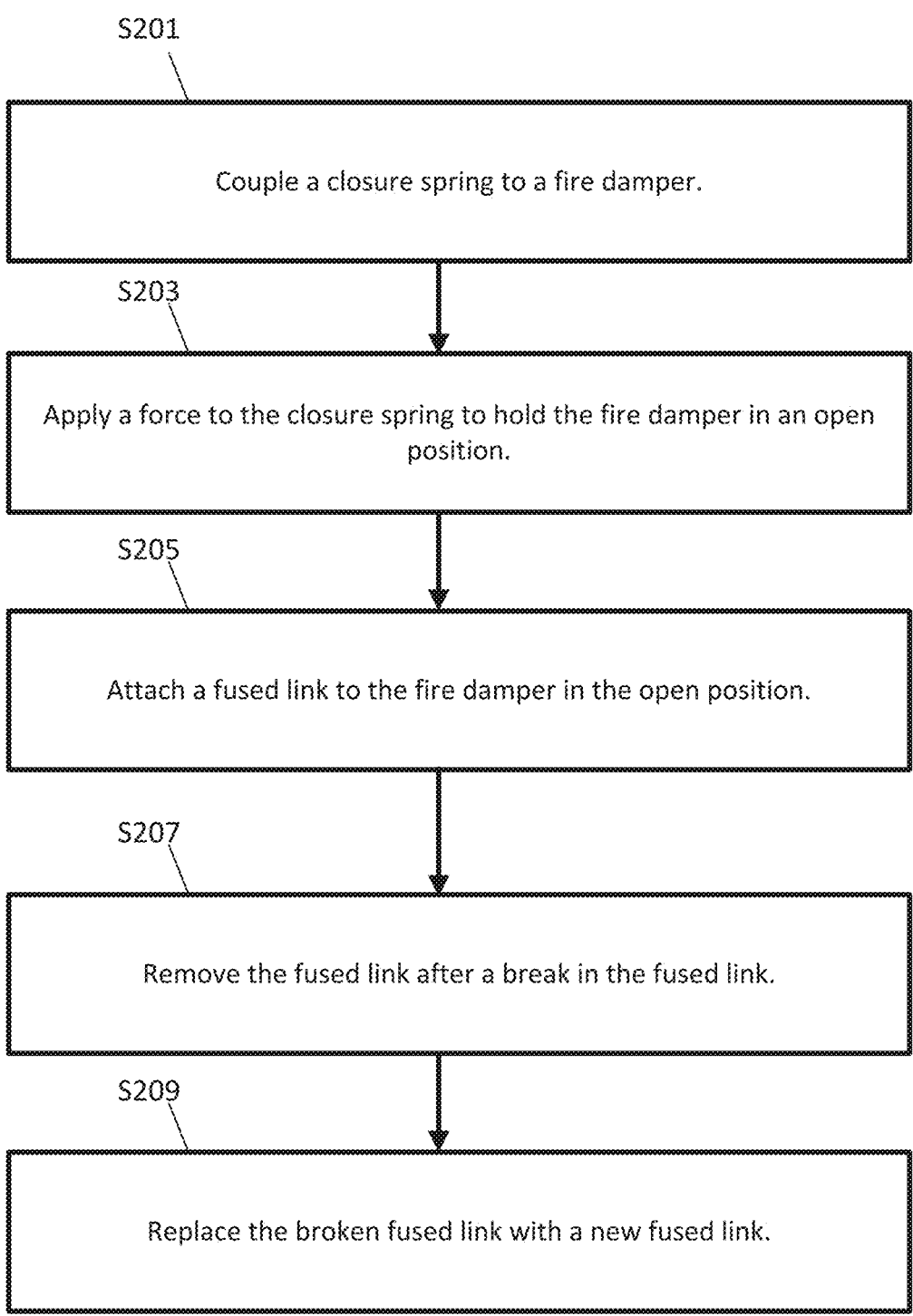
FIG. 12 illustrates an example flowchart for assembly of the fire damper.

FIG. 12 illustrates an example flowchart for assembly of the fire damper and/or a method of manufacturing the fire damper on the generator enclosure. Additional, different or fewer acts may be included.

At act S201, a closure spring is coupled to a closing mechanism 22 of the fire damper 11. The closure spring is configured to move the closing mechanism 22 of the fire damper 11 to a closed position. The closing mechanism 22 may include accordion style panels that form the door of the fire damper 11. The closure spring may be attached to the frame of the fire damper 11 and one or more panels that form the door of the fire damper 11.

At act S203, a force is applied to the closure spring to place the closure mechanism 22 in an opened position. For example, a clamp may be used to hold the closure mechanism 22 in a compressed state (e.g., FIG. 2), which may be referred to as the initial state for operation of the fire damper 11. Alternatively, the user may manually (e.g., by hand) hold the closure mechanism 22 in the compressed state. With the closure mechanism 22 compressed, the fused link 21 may be installed.

At act S205, the fused link 21 is attached to the closing mechanism 22 in the compressed state or open position and holds the closing mechanism 22 in the compressed state or open position. The fused link 21 prevents the transition of the closing mechanism 22 from the open position (FIG. 2) to the closed position (FIG. 3). In one example, the fused link 21 is coupled to the frame of the fire damper and also coupled to the opposite end of the closing mechanism 22. The coupling may be a screw, rivet, or an adhesive.

The fused link 21 is configured to break at a predetermined temperature which provides the transition of the closing mechanism 22 from the open position to the closed position under the force of the closure spring.

Acts S207 and S209, which are optional, occur after a break in the fused link 21 and are not part of the installation of the initial fused link 21. At act S207, the broken fused link 21 is remove from the closing mechanism 22. At act S209, a replacement fused link is coupled to the closing mechanism 22 and the frame of the fire damper 11.

The controller 100 may include a general processor, digital signal processor, an application specific integrated circuit (ASIC), field programmable gate array (FPGA), analog circuit, digital circuit, combinations thereof, or other now known or later developed processor. The processor may be a single device or combinations of devices, such as associated with a network, distributed processing, or cloud computing. The controller 100 may include a memory such as a volatile memory or a non-volatile memory. The memory may include one or more of a read only memory (ROM), random access memory (RAM), a flash memory, an electronic erasable program read only memory (EEPROM), or other type of memory. The memory 201 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

An input device may provide user inputs to the controller 100 such as setting the temperature thresholds. The input device may include a button, a switch, a key pad, a touchscreen, a key, an ignition, or other structure configured to allow a user to enter data or provide a command to operate the engine. The input device may include a connection to a network, a smartphone, a tablet, a personal computer configured to electronically transmit the command to the engine. The communication may be wireless or wired (e.g., received by the communication interface).

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The phrases "coupled with" or "coupled to" include directly connected to or indirectly connected through one or more intermediate components. Additional, different, or fewer components may be provided. Additional, different, or fewer components may be included.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A generator enclosure for an engine-generator, the generator enclosure comprising:
    a cavity defined by a plurality of walls;
    an intake air path providing fluid communication between the cavity and an ambient environment;
    an exhaust air path providing fluid communication between the cavity and the ambient environment;
    a fire damper configured to obstruct one of the intake air path or the exhaust air path, the fire damper comprising a frame, an opening, and a translatable door; and
    a link configured to retain the translatable door in an open position such that the intake air path and the exhaust air path remain unobstructed.

2. The generator enclosure of claim 1 wherein the link releases the translatable door at a predetermined temperature.

3. The generator enclosure of claim 1 wherein the link includes a thermally sensitive material.

4. The generator enclosure of claim 1 wherein the fire damper comprises a first fire damper, wherein the generator enclosure comprises a second fire damper, the first fire damper configured to obstruct the intake air path and the second fire damper configured to obstruct the exhaust air path.

5. The generator enclosure of claim 1 wherein the link is coupled to the fire damper.

6. The generator enclosure of claim 1 further comprising a spring configured to apply a bias force to the fire damper.

7. The generator enclosure of claim 1 further comprising a weight configured to apply a bias force to the fire damper translatable door.

8. The generator enclosure of claim 1 further comprising a sensor configured to detect temperature and a controller configured to retract a retaining mechanism to release the fire damper to block the exhaust air path or the intake air path.

9. The generator enclosure of claim 1 wherein the door comprises accordion-style panels.

10. The generator enclosure of claim 1 wherein the door comprises a slide-to-close assembly that expands to close the opening.

11. The generator enclosure of claim 1 wherein the door is collapsible toward a side of the frame to place the door in its open position.

12. A method for controlling a fire within a generator enclosure, the method including:
    receiving, at a controller, sensor data for a temperature within a cavity of the generator enclosure;
    performing, at the controller, a comparison of the sensor data to a threshold temperature; and
    generating, at the controller, an actuation command for the fire damper in response to the comparison.

13. The method of claim 12 further comprising sending the actuation command to a release mechanism configured to release the fire damper, the fire damper under an external force.

14. The method of claim 12 further comprising sending the actuation command to a motor to apply a force to the fire damper.

15. The method of claim 12 further comprising receiving a user input at the controller.

16. The method of claim 15 wherein the user input sets the threshold temperature.

17. The method of claim 15 wherein the user input initiates a test sequence for the controller.

18. A method of controlling a fire within a generator enclosure, the method including:
    coupling a closure spring to a fire damper, wherein the closure spring is configured to bias the closing mechanism of the fire damper to a closed position;
    applying a force to the closure spring to place the fire damper in an opened position; and
    attaching a link to the fire damper, wherein the link prevents the fire damper from transitioning from the open position to the closed position;
    wherein the link is configured to break at a predetermined temperature, allowing the fire damper to slide from the open position to the closed position in response to a force applied by the closure spring.

19. The method of claim 18 wherein the link includes a thermally sensitive material.

20. The method of claim 18 wherein the fire damper is configured to cover an exhaust air opening of the generator enclosure.

21. The method of claim 18 wherein the fire damper is configured to cover an air inlet of the generator enclosure.

22. The method of claim 18 further comprising removing the link after a break in the link and attaching a replacement link to the fire damper.

* * * * *